Nov. 8, 1955     E. J. WELLAUER     2,723,015
PRESSURE-OPERATED FRICTIONAL COUPLING
Filed Aug. 24, 1950
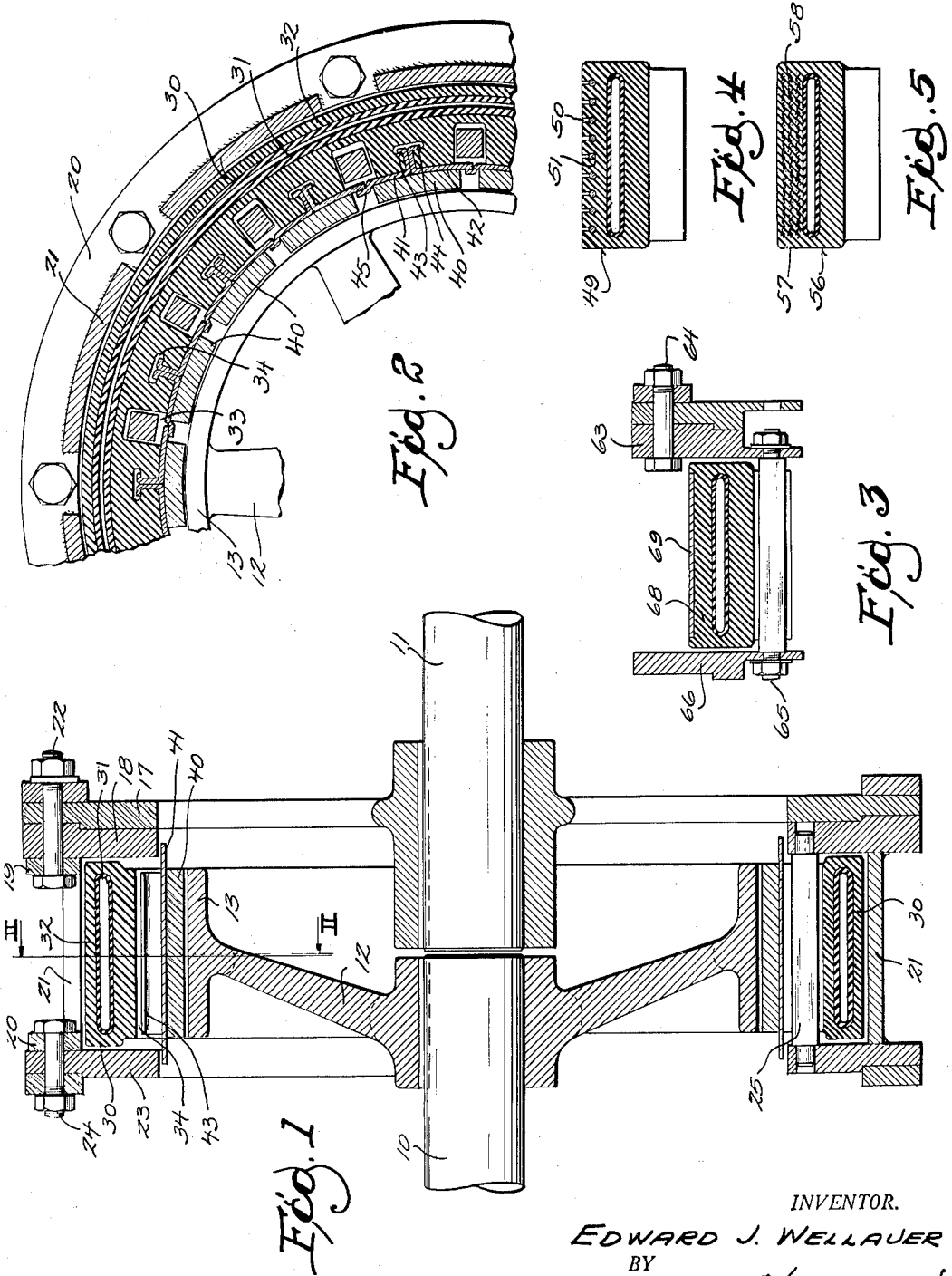
INVENTOR.
EDWARD J. WELLAUER
BY
Miles Henninger
ATTORNEY

2,723,015

PRESSURE-OPERATED FRICTIONAL COUPLING

Edward J. Wellauer, Wauwatosa, Wis., assignor to The Falk Corporation, Milwaukee, Wis., a corporation of Wisconsin Application August 24, 1950, Serial No. 181,170

4 Claims. (Cl. 192—88)

This invention relates to improvements in devices for frictionally coupling two relatively movable machine parts, and more particularly to brakes or clutches of the type in which an expansible and collapsible gland is used to bring other portions of the brake or clutch structure into frictional engagement.

In constructions of the character disclosed herein, it has heretofore been the practice to bond to the gland one or the other of the metallic clutch parts, which required shipping of metal parts to the manufacturer of the gland for the bonding operation and the re-shipment thereof to the clutch manufacturer. The bonding operation involves conditions which may damage such metal parts and such bonding is not conducive to proper cooling of the gland during use so that the gland frequently deteriorates due to the heating, even when otherwise free from conditions tending to destroy the gland.

Further, such bonding does not permit positioning of the gland to compensate for axial or radial inaccuracies or misalignments or other parts. The torque was heretofore transmitted through the flexing walls of the gland and therefore required reinforcement of such flexing gland walls for adequate transmittal of the torque. But such reinforcement was not conducive to easy flexing actions and made the structure less sensitive to pressure than is frequently desired. All the above factors contribute to the cost both of manufacture and maintenance of an expansible gland operated brake or coupling and resulted in the lack of a number of qualities desirable in such brake or couplings.

It is therefore an object of the present invention to provide a brake or clutch of the fluid pressure operated gland type in which the gland is free from and self-adjusting relative to the other parts of the clutch to compensate for inaccuracies or misalignments of other clutch parts but without stressing the gland.

Another object of the invention is to provide a brake or clutch in which torque is transmitted to and from the gland otherwise than through the flexing gland side walls and with the minimum of friction between the gland and the other clutch parts coacting therewith.

Another object of the invention is to provide a brake or clutch of the fluid pressure actuated gland operated type in which the gland is automatically so positioned relative to other clutch parts as to secure flow of air about the gland for cooling the same; and Another object of the invention is to provide a brake or clutch of the fluid pressure expansible gland operated type in which the backing or reaction member for the gland is formed as a part of the gland itself.

Objects and advantages other than those above set forth will be apparent from the following description when read in connection with the accompanying drawing in which:

Fig. 1 is a cross-sectional view on a plane through the axis of two shafts to be coupled by a clutch of the expansible gland operated type.

Fig. 2 is a cross-sectional view on the plane of line II—II of Fig. 1, of a fragment of the present construction.

Fig. 3 is a transverse cross-sectional view showing a modified form of gland and the portion of the clutch retaining the same; and Figs. 4 and 5 are transverse cross-sectional views of modified forms of the gland itself which may be utilized in place of the gland of Fig. 3.

Generally, the present clutch provides a friction member or drum mounted on one of two substantially co-axial shafts to be coupled. The friction drum extends toward a cage or retainer member fixed on the other shaft and in such manner as to define therewith a substantially cylindrical space. A flexible and resilient gland is loosely retained in the space and is adapted to be expanded or contracted to cause, respectively, coupling or uncoupling of the drum and gland retainer members. The gland has several non-flexing walls of which one is thickened and provided with grooves for detachably engaging bars transmitting torque to or from the gland. Other gland grooves detachably receive shoes for frictionally engaging with the friction drum. Both sets of grooves are so proportioned that the torque bars and shoe lugs entering the respective grooves do not materially interfere with flow of air through the grooves.

In the first embodiment of the invention, the backing or reaction member for the gland is a part of the retaining cage, while in the other embodiments of the invention, the backing member is a part of the gland itself.

Referring to the drawings in which like numerals refer to like parts, 10 and 11, respectively, designate two substantially co-axial shafts of which one is a driving shaft and the other is a driven shaft. Shaft 10 has fixed thereon a wheel-like structure 12 with a relatively wide rim 13 which in the present construction provides a friction surface or drum.

Shaft 11 has fixed thereon a wheel 17 with an annular disk-like member 18 secured thereto. A ring substantially U-shaped in section and comprising flanges 19, 20 joined by a web 21, is clamped on the disk and wheel. The ring web is interrupted or slotted at intervals to provide space for the heads of bolts 22 securing the ring 19, 20, 21 to the disk 18. An annular disk-like member 23 is claimed on the ring flange 20 by bolts 24 to coact with the disk 18, the ring 19, 20, 21 and the friction drum 12, 13 in defining a substantially cylindrical space. The disk 23 has bars 25 extending at intervals from one side thereof, the bars having cylindrical ends severally socketed in the disks 18 and 23 and having a rectangular cross-section between the ends. Hence, the bars may pivot as required.

An expansible and collapsible gland generally designated 30 comprises an inner tube 31 of resilient fluid-retaining material bonded in an outer tube 32 of heat and air resistant, flexible and preferably resilient material. The gland is substantially hollow and cylindrical in form and the gland sides (the cylinder ends) are readily flexible while the inner and outer peripheral walls are substantially non-flexing. The one circumferential and non-flexing wall is considerably thickened and provided with two series of different shaped grooves 33, 34. The grooves 33 are shaped to receive the rectangular portions of bars 25 and are larger than such bars so that the gland may shift radially, laterally or angularly relative to the bars as the gland expands and contracts. Means are also provided for furnishing fluid under pressure to the gland as is shown, for example, in U. S. Patent 2,268,143, issued to Schmitter and Schwartz December 30, 1941.

Blocks 40 of heat resistant and high friction material are formed as segments of a circle and are severally backed by plates 41, 42 fixed thereto on the outer periphery of the cylinder formed by the assembled shoes. Such plates have flanges 43, 44 in adjacent relationship and provided with lugs to be detachably held in the grooves 34 in the gland. The plates overlap as indicated at 45 to provide abutments and joints between adjacent plates. When the blocks 40—45 are mounted as shown in Fig. 2, the blocks form an articulated circular structure supported on the gland 30 and in engagement with one another by way of their several backing plates. The blocks are thus adapted to be moved into and out of contact with the outer surface of the friction drum 12, 13. It will be noted from Fig. 1 that the plates 41—44 are radially inwardly of and overlap the disks 19 and 23 which thus provide a stop for limiting radially outward movement of the block structure.

The present construction accordingly provides a brake or clutch of the expansible gland type in which the gland is free from both the inner and the outer clutch members and may adjust radially, axially or angularly as required by the relationship of the clutch members. The bars 25 transmit torque between one of the clutch parts and the gland and pivot to position themselves in their grooves as required by the positioning of the gland. The friction blocks are not fixed to the gland and may adjust themselves relative to the gland and to each other without imposing stresses on the gland. It will be noted that both series of grooves provide for the flow of air therethrough especially when the metallic and resilient parts move relative to each other and aid in keeping the gland cool. The ring 19, 20, 21 provides a reacting surface for the gland when the gland is expanded and air may flow between the gland and the ring when the gland is collapsed.

Figs. 3, 4 and 5 show modifications of the gland structure by which the reaction ring 19, 20, 21 may be omitted. Fig. 3 is a modification of the present construction in which an annular disk-like member 63 is mounted on the wheel member 18 by bolts 64 and receives bolts 65 adjacent its inner periphery for the mounting of another disk-like member 66. Such bolts now serve also as the torque bars extending through grooves 33 of the gland member 68, the bolts being fixed and preferably of cylindrical section to minimize friction in the grooves 33. The gland member 68 has its outer peripheral wall recessed to receive a metallic band 69 which is drawn into the gland recess by suitable means such as bolts joining the ends of the bands. The ends of the bands overlap to provide for complete encirclement by the gland by a relatively inelastic member which is the reaction member.

In Fig. 4 the outer peripheral wall of the gland 49 is thickened and is formed with peripheral grooves 50 to receive loops of a flexible but relatively inelastic material such as steel cables or wires 51 on which the reaction of the gland is exerted. It will be noted that the loops 51 are imbedded deeply in the gland wall but such loops are easily insertable and removable from the grooves. In Fig. 5, the gland 56 has a thickened wall portion 57 in which is permanently imbedded a cord or wire fabric structure 58 as in pneumatic vehicle tire construction excepting that such cords or fabric need not flex to accommodate for road inequalities as is the case with a tire.

It will thus be seen that none of the resilient material parts in the present construction require the bonding thereto of metallic parts. The gland is free to shift relative to other clutch parts which allows compensation of misalignments and absorbs some shocks and vibration. All of the metal parts transmitting torque to or from the gland are placed in grooves in the gland and such grooves have large clearances so that there is ample space for flow of air therethrough. The space receiving the gland is also relatively large so that cooling air may flow through the space and through the retainer member slots especially when the gland is collapsed.

The present construction provides a friction member movable relative to a retainer member and such members coact in substantially enclosing a cylindrical space in which an expansible and collapsible gland is loosely held to position itself as required. The gland has readily flexing side walls and substantially non-flexing peripheral walls. One of the non-flexing walls is thickened and grooved for engagement therewith or torque transmitting bars and friction shoes. The torque bars are either pivoted or shaped to minimize friction with the gland surfaces during operation and coact with the friction member and retainer member in positioning the gland. The friction shoes have separate backing plates which are formed for easy attachment of the shoes to the gland and so related to one another as to provide an articulated friction band when assembled. When the gland-retainer member is provided with a ring to react against expansion of the gland, such ring is apertured for cooling the gland and where one of the non-flexing walls of the gland is provided with inelastic means to react against expansion of the gland, such gland wall is exposed for cooling.

It will be understood that the present construction is equally well adapted for use in either an expanding or contracting type of brake or clutch. For an expanding type of device, the positions of parts are changed with some changes in structure due to the position changes. The functioning of the part will however be similar and the necessary changes are well within the scope of one skilled in the art.

Although but a few embodiments of the present invention have been illustrated and described, it will be apparent to those skilled in the art that various changes and modifications may be made therein without departing from the spirit of the invention or from the scope of the appended claims.

I claim:

1. In a clutch or brake, the combination of two substantially coaxial cylindrical members in peripherally spaced relation, resilient annular means comprising an expansible fluid receiving portion and a thickened cushion portion between said members, a plurality of torque-transmitting bars radially fixed in one of said cylindrical members and severally extending loosely through said cushion portions of said means for rotation therewith, and friction shoes mounted on said cushion portion independently of said bars for engaging the other of said cylindrical members upon expansion of said expansible portion of said means whereby torque is transmitted between said bars and said shoes only through said cushion portion of said means.

2. In a clutch or brake, the combination of two substantially coaxial cylindrical members in peripherally spaced relation, resilient fluid pressure receiving means comprising an expansible fluid receiving portion and a thickened cushion portion with grooves therein, said means being between adjacent surfaces of said members, a plurality of torque-transmitting bars radially fixed at the ends in one of said cylindrical members and severally having a rectangular portion engaging in the grooves in said cushion portion and free therefrom for limiting movement of said means relative to the said one of said cylindrical members, and friction shoes loosely engaged with said cushion portion independently of said bars for bearing on the other of said cylindrical members upon expansion of said expansible portion of said means whereby torque is transmitted between said bars and said shoes through said cushion portion of said means.

3. In a clutch or brake, a cylindrical friction member, a cylindrical gland retainer substantially coaxial with and peripherally spaced from said friction member, a substantially annular resilient gland carried by said retainer for coaction with said friction member, said gland comprising a portion expansible upon admission of fluid pressure thereinto, inelastic means mounted on a wall of said expansible portion of said gland for preventing expansion thereof in one radial direction and permitting expansion of said gland toward said friction member, torque-transmitting means connecting said gland with said gland retainer, and means movable into frictional engagement with said friction member by said gland upon expansion of the expansible portion of said gland toward said friction member.

4. In a clutch or brake, a cylindrical friction member, a cylindrical gland retainer substantially coaxial with and peripherally spaced from said friction member, an annular resilient gland comprising a first peripheral portion expansible toward said friction member responsive to admission of fluid pressure into said gland and a second non-expansible peripheral portion movable under expansion of the first portion, said gland retainer limiting axial expansion of said first gland portion, inelastic means carried by said gland peripherally about said first gland portion for preventing expansion thereof in one radial direction, and shoes mounted on said second gland portion for movement into contact with said friction member upon admission of fluid pressure into said first gland portion.

References Cited in the file of this patent

UNITED STATES PATENTS

| | | |
|---|---|---|
| 2,194,853 | Hatch et al. | Mar. 26, 1940 |
| 2,229,922 | Heinze | Jan. 28, 1941 |
| 2,246,979 | Kraft et al. | June 24, 1941 |
| 2,252,128 | Kraft | Aug. 12, 1941 |
| 2,268,509 | Kraft | Dec. 30, 1941 |
| 2,283,325 | Fawick | May 19, 1942 |
| 2,382,570 | Kraft | Aug. 14, 1945 |
| 2,422,227 | Fawick | June 17, 1947 |
| 2,434,761 | Fawick | Jan. 20, 1948 |
| 2,630,198 | Kraft | Mar. 3, 1953 |
| 2,637,427 | Kraft | May 5, 1953 |

FOREIGN PATENTS

| | | |
|---|---|---|
| 914,566 | France | Oct. 11, 1946 |